United States Patent
Iyer et al.

(10) Patent No.: US 8,316,339 B2
(45) Date of Patent: Nov. 20, 2012

(54) ZONE-BASED LEAKAGE POWER OPTIMIZATION

(75) Inventors: Mahesh A. Iyer, Fremont, CA (US); Sudipto Kundu, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 338 days.

(21) Appl. No.: 12/695,556

(22) Filed: Jan. 28, 2010

(65) Prior Publication Data

US 2011/0185334 A1    Jul. 28, 2011

(51) Int. Cl.
*G06F 17/50* (2006.01)
(52) U.S. Cl. .......................... 716/133; 716/132; 716/134
(58) Field of Classification Search .................. 716/106, 716/113, 132, 133, 134, 135
See application file for complete search history.

(56) References Cited

U.S. PATENT DOCUMENTS

| | | | |
|---|---|---|---|
| 7,219,048 B1 * | 5/2007 | Xu | 703/19 |
| 7,370,294 B1 | 5/2008 | Rahman | |
| 7,512,919 B2 * | 3/2009 | Visweswariah | 716/113 |
| 7,840,918 B1 | 11/2010 | Duthou | |
| 2002/0124230 A1 | 9/2002 | Cai | |
| 2005/0251776 A1 * | 11/2005 | Hsin et al. | 716/11 |
| 2007/0016881 A1 | 1/2007 | Gregory | |
| 2009/0100393 A1 * | 4/2009 | Visweswariah et al. | 716/6 |

* cited by examiner

*Primary Examiner* — Vuthe Siek
(74) *Attorney, Agent, or Firm* — Park, Vaughan, Fleming & Dowler LLP; Laxman Sahasrabuddhe

(57) ABSTRACT

A leakage power optimization system optimizes leakage power of a circuit design which includes a set of logic gates. The system selects a leakage-power-reducing transformation for a logic gate, and determines a zone around the logic gate. This zone includes logic gates within a first predetermined number of levels in the logic gate's fan-out, the logic gate's fan-in, and a second predetermined number of levels in the logic gate's fan-in's fan-out. The system propagates arrival times within the zone to obtain updated slack values at endpoints of the zone. Then, in response to determining that the updated slack values at the endpoints of the zone do not degrade one or more circuit timing metrics, the system applies the leakage-power-reducing transformation to the logic gate.

21 Claims, 7 Drawing Sheets

ZONE-BASED LEAKAGE POWER OPTIMIZATION

BACKGROUND

1. Technical Field

This disclosure generally relates to electronic design automation. More specifically, this disclosure relates to methods and apparatuses for zone-based leakage power optimization.

2. Related Art

Advances in semiconductor technology presently make it possible to integrate large-scale systems onto a single semiconductor chip. This dramatic increase in semiconductor integration densities has made it considerably more challenging to efficiently perform leakage power optimization.

The leakage power of a circuit is the amount of power dissipated by the circuit when the circuit's metal-oxide-semiconductor (MOS) transistors are not switching on or off. Note that there is a tradeoff between the speed and the leakage power of a transistor. Specifically, transistors with a low threshold voltage (Vth) can be turned on and off faster than transistors with a high Vth because additional time is required to ramp-up the input voltage of these transistors toward Vth. However, transistors with a high Vth have less leakage power than transistors with a low Vth.

Unfortunately, conventional leakage-power optimization techniques are inefficient and/or generate poor quality of results (QoR). A circuit design's leakage power can be improved by replacing a logic gate with another functionally equivalent logic gate that dissipates a lower leakage power, if the transformation does not violate any design requirements. Specifically, for each transformation, conventional techniques typically perform a significant amount of computation to determine whether the transformation violates any timing metrics. Further, conventional leakage-power optimization techniques attempt to transform every logic gate of a circuit design in search for every opportunity to improve leakage power of the circuit design.

SUMMARY

Some embodiments provide techniques and systems for optimizing leakage power of a circuit design which includes a set of logic gates. The system selects a leakage-power-reducing transformation for a logic gate, and determines a zone around the logic gate. This zone includes logic gates within a first predetermined number of levels in the logic gate's fan-out, the logic gate's fan-in(s), and a second predetermined number of levels in the fan-out(s) of the logic gate's fan-in(s). The system propagates arrival times within the zone to obtain updated slack values at endpoints of the zone.

Then, in response to determining that the updated slack values at the endpoints of the zone do not degrade one or more circuit timing metrics, the system applies the leakage-power-reducing transformation to the logic gate. On the other hand, if one or more timing metrics degrade, the system can reject the transformation. The circuit timing metrics at the endpoints of the zone can include, but are not limited to, a worst negative slack (WNS) metric, and/or a total negative slack (TNS) metric.

The system can keep track of which required times are out-of-date and update them on an as-needed basis. Specifically, before computing the circuit timing metrics at the endpoints of the zone, the system can update the required times of the endpoints if they are out-of-date. Further, after applying the selected transformation, the system can determine a cone of logic that extends backward from the endpoints of the zone, and mark required times associated with terminals of logic gates in the cone of logic as out-of-date.

In some embodiments, the system determines a reverse levelized processing order for processing the logic gates, and selects the logic gates for optimization according to the processing order. To determine the processing order, the system can associate a level with each logic gate so that each logic gate's level is greater than the highest level associated with logic gates that are electrically coupled to the logic gate's fan-in. Then, the system can order the logic gates in decreasing order of the associated levels.

The system can also use the leakage potentials associated with the logic gates to determine the processing order. Note that a logic gate's leakage potential indicates an amount or degree by which the logic gate's leakage power is decreasable. In some embodiments, the system can associate the logic gates with leakage-potential bins based on the leakage potentials. Note that a leakage-potential bin is associated with a range of leakage potential values.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Integrated Circuit (IC) Design Flow

Figure 1:
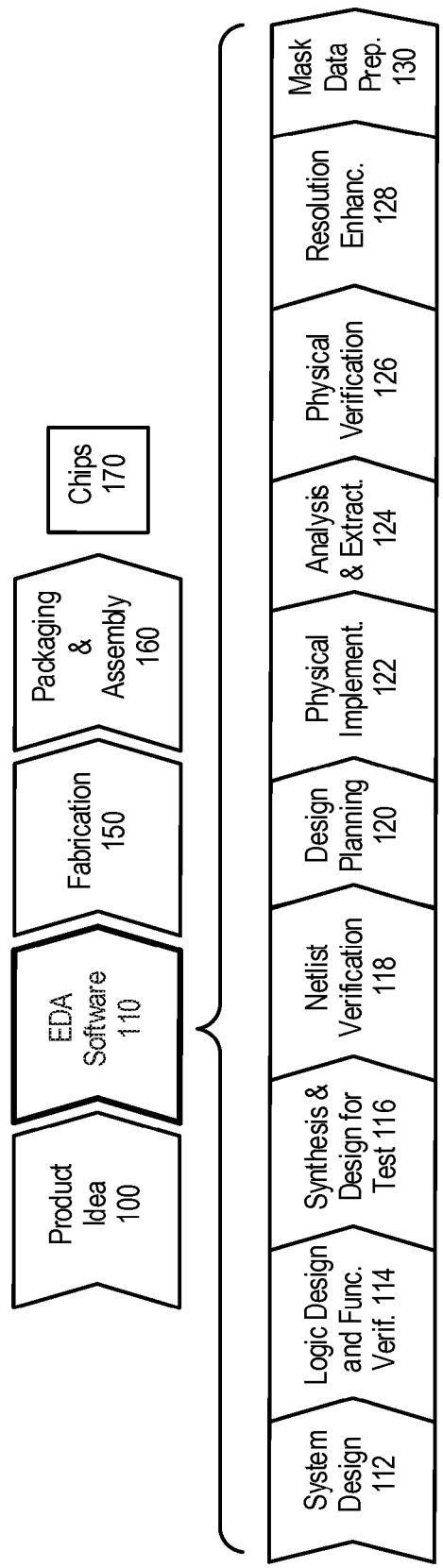
FIG. 1 illustrates various stages in the design and fabrication process of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a VHDL or Verilog design can be created and checked for functional accuracy.

In the synthesis and design step 116, the VHDL/Verilog code can be translated to a netlist, which can be optimized for the target technology.

Further, in this step, tests can be designed and implemented to check the finished chips. In the netlist verification step 118, the netlist can be checked for compliance with timing constraints and for correspondence with the VHDL/Verilog code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to ensure correctness for manufacturing, electrical issues, lithographic issues, and circuitry.

In the resolution enhancement step 128, geometric manipulations can be performed on the layout to improve manufacturability of the design. Finally, in the mask data preparation step 130, the design can be taped-out for production of masks to produce finished chips.

Embodiments of the present invention can be used in one or more of the above-described steps.

The Leakage Power Optimization Problem

A circuit design's representation is composed of logic gate instantiations, such that each logic gate is associated with a leakage power. If MOS transistors are used, the leakage power is dependent on the threshold voltages for the MOS transistors in the logic gate. As noted above, the performance of the logic gate (e.g., the maximum switching frequency of a MOS transistor) is also dependent on the threshold voltage. A circuit designer's goal is to minimize leakage power of the circuit, without violating any design requirements for the circuit design (e.g., timing, capacitance, or transition requirements).

Leakage power optimization can be performed by applying transformations to logic gates of the circuit design. A transformation of a logic gate is generally any modification of the logic gate. For example, a transformation can involve replacing a logic gate with a different logic gate from a technology library, such that the functionality of the circuit is maintained. Before applying a transformation to a logic gate, the system can determine whether the transformation violates any performance or design requirements of the circuit design. If the transformation does not violate any performance or design requirements, the system can apply the transformation. Otherwise, the system can try a different transformation.

There are at least two types of timing requirements: setup time requirements and a hold time requirements. A setup time requirement is violated if a signal reaches a pin later than it is supposed to reach, e.g., a setup time violation may occur when a signal reaches a register input after the clock transition. A hold time requirement is violated if a signal does not remain stable for a sufficient amount of time, e.g., a signal at a register's input may change before the register can capture the signal's value.

The delay experienced by a signal at a logic gate can depend on a number of factors. For example, the delay can be different for different input/output terminal pairs. Further, delay can depend on the capacitive load on the output terminal and/or the transition time of the input signal. Note that the transition time is the amount of time it takes for a signal to switch from one state to another.

Arrival times and required times are used to determine whether a design meets the timing requirements. The arrival time associated with a terminal of a logic gate indicates when a signal is expected to arrive at the terminal. The required time associated with the terminal indicates when the signal is required to arrive at the terminal. The slack associated with a terminal is the difference between the required time and the arrival time. Typically, the slack of a terminal is said to be violating if it is less than a predetermined threshold value.

Conventional systems perform timing analysis on the circuit design to determine whether a particular leakage reducing transformation will violate timing requirements. For example, in a typical conventional system, the system first applies a transformation to a logic gate. Next, the conventional system forward propagates arrival times and transition times towards the endpoints of the circuit design. The conventional system then computes one or more timing metrics for the entire design, using the required times on the timing endpoints of the design.

Note that, while an improvement in leakage power for a logic gate always will result in an improvement in leakage in the global design, the same may not hold true for the timing metrics. If the conventional system determines that the global timing of the design is degraded as a result of a transformation, the conventional system rejects the transformation.

If the transformation is accepted, the arrival times and transition times are generally up-to-date due to the forward propagation that was performed to compute the global timing metrics. However, since the delays of the various cells and nets in the design may have changed during this forward timing propagation, the required times of the design are usually out-of-date. Hence, conventional systems then update the required times by propagating the required times backwards all the way to the timing startpoints of the design, in order to get a valid context for the leakage recovery optimization for the next logic gate.

Figure 2:
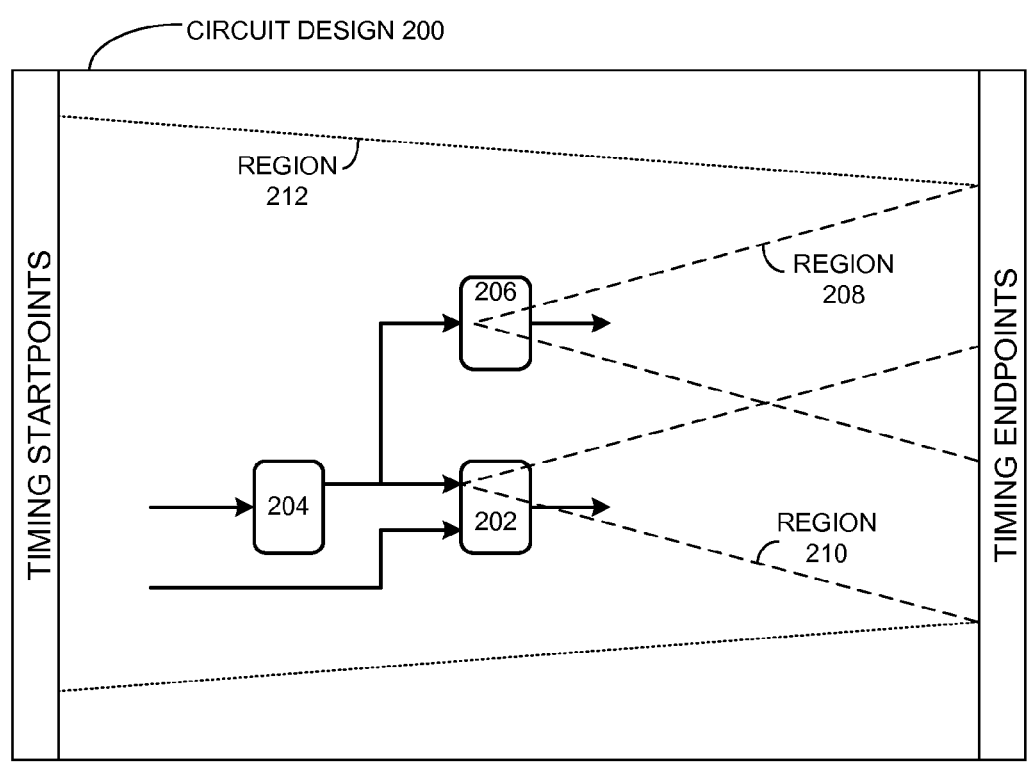
FIG. 2 illustrates how timing information is propagated in a circuit design.

FIG. 2 illustrates how timing information is propagated in a circuit design.

Circuit design 200 includes logic gate 202 that is being optimized. Applying a transformation to logic gate 202 can change the capacitive load on logic gate 204 which can change the arrival and transition times at logic gate 204's output, logic gate 202's input, and logic gate 206's input. This change in timing information can ripple through regions 208 and 210 to the timing endpoints of circuit design 200. Note that an endpoint can be a register or a primary output or any point in the circuit design where a timing requirement is enforced. Changing the timing information at the timing endpoints of the design causes the required times in the entire fan-in cones of all these timing endpoints to be out-of-date. Hence, after propagating the timing information in the forward direction, conventional systems typically propagate required times backwards, e.g., backwards along region 212 all the way to the startpoints. General information on static timing analysis and propagation of timing information can be found in Luciano Lavagno (Editor), Louis Scheffer (Editor), Grant Martin (Editor), *EDA for IC Implementation, Circuit Design, and Process Technology* (*Electronic Design Automation for Integrated Circuits Handbook*), CRC Press, 1st Ed., March 2006.

To summarize, conventional approaches ensure a valid local context by forcing a timing update of the entire design whenever a change is accepted. Since all timing is updated, this guarantees that the local context for next logic gate or cell will be valid regardless of the location of the logic gate or cell. Note that most of the computation is wasted because the next logic gate that is visited will most likely change timing again.

Updating arrival and required times for the entire circuit can be computationally expensive. The worst-case complexity of a full timing update can be exponential with respect to the circuit design's size. As a result, the timing update operation can become a runtime bottleneck in a conventional synthesis optimization system (e.g., logic synthesis and physical synthesis).

Furthermore, conventional techniques for leakage power optimization try to optimize all logic gates in the circuit design. If the circuit design is large, trying to optimize the leakage power of all logic gates can result in an unreasonably long computation time. Hence, conventional techniques typically impose a time limit for performing leakage power optimization. In other words, the system tries to optimize the leakage power of all logic gates, but terminates the process after a predetermined amount of time. Although this approach ensures that the optimization process is guaranteed to terminate within the predetermined amount of time, it can result in poor QoR. Hence, what is needed are efficient approaches for optimizing the leakage power of a circuit design which produce good QoR.

Leakage Power Optimization

Leakage power optimization typically requires a system to visit every logic gate in a circuit design, and attempt several leakage-power-reducing transformations at each logic gate. Some embodiments of the present invention substantially reduce the amount of computation required to perform leakage power optimization. Specifically, some embodiments process logic gates in an order which enables the system to substantially reduce the amount of timing updates required to ensure that the transformations do not degrade timing metrics. In contrast to conventional techniques, some embodiments of the present invention allow timing information to be out-of-date in parts of the design.

Specifically, some embodiments of the present invention use the following three features to improve performance: (a) reverse levelized order of processing cells for leakage recovery from timing endpoints to timing startpoints; (b) level-limited (e.g., within a zone around the logic gate being optimized) forward incremental timing updates for delay, arrival and transition times to evaluate a leakage recovery change using local transforms; and (c) lazy and limited incremental required time updates that are performed "just in time," e.g., after a cell is selected for leakage recovery, but before it is processed for leakage recovery.

Figure 3:
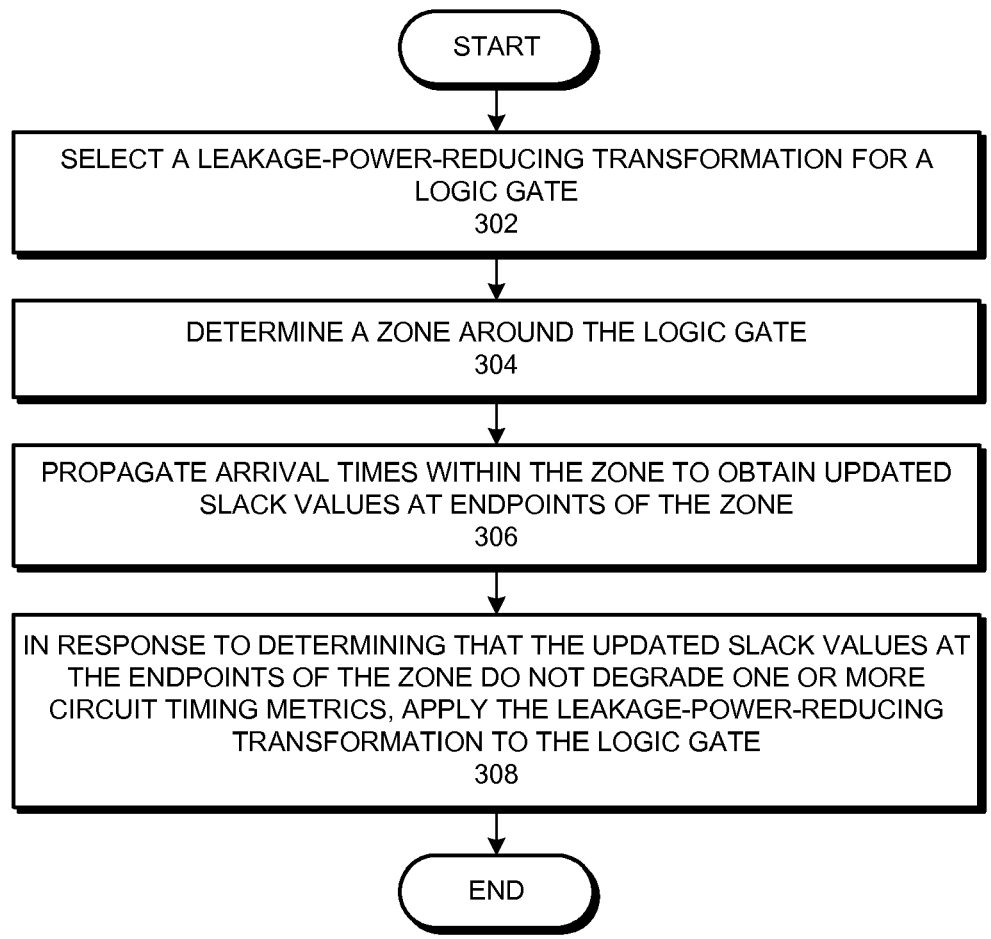
FIG. 3 presents a flowchart illustrating a process for optimizing leakage power of a circuit design in accordance with some embodiments of the present invention.

FIG. 3 presents a flowchart illustrating a process for optimizing leakage power of a circuit design in accordance with some embodiments of the present invention.

The process can be performed by a computer system which stores instructions and executes these instructions using a processor. The system can begin by selecting a leakage-power-reducing transformation for a logic gate (operation 302). The system can then determine a zone around the logic gate (operation 304). In general, a zone can include an arbitrary portion of the circuit design that includes the logic gate. In some embodiments, a zone includes logic gates within a first predetermined number of levels in the logic gate's fan-out(s), the logic gate's fan-in(s), and a second predetermined number of levels in the fan-out(s) of the logic gate's fan-in(s).

Next, the system propagates arrival times within the zone to obtain updated slack values at endpoints of the zone (operation 306). In addition to arrival times, the system may also propagate other types of timing information, e.g., delays and transition times. Then, in response to determining that the updated slack values at the endpoints of the zone do not degrade one or more circuit timing metrics, the system applies the leakage-power-reducing transformation to the logic gate (operation 308). The timing metrics can include, but are not limited to, a worst negative slack (WNS) metric, and a total negative slack (TNS) metric.

Figure 4:
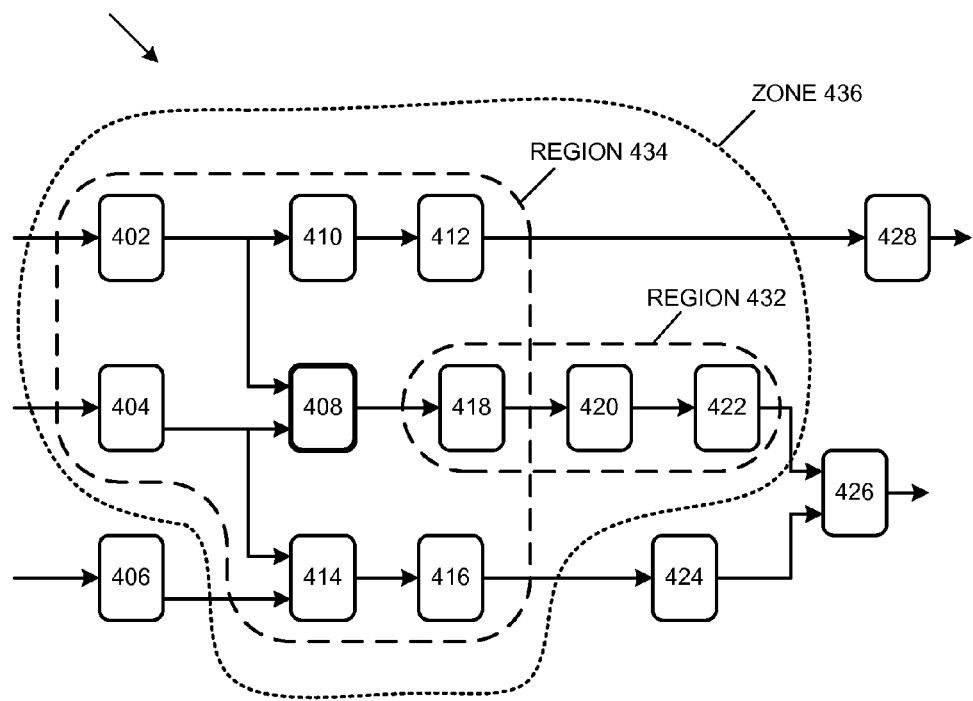
FIG. 4 illustrates a zone around a logic gate in accordance with some embodiments of the present invention.

FIG. 4 illustrates a zone around a logic gate in accordance with some embodiments of the present invention.

Circuit design 400 includes logic gates 402-428. Let us assume that logic gate 408 is being optimized. As mentioned above, a zone around logic gate 408 can generally include any arbitrary portion of the circuit design which includes logic gate 408. In the example shown in FIG. 4, zone 436 includes logic gates which are within three levels of logic gate 408's fan-out (region 432 which includes logic gates 418-422), logic gate 408's fan-ins (logic gates 402 and 404), and logic gates which are within two levels of logic gate 408's fan-in's fan-out (region 434, which includes logic gates 408-416). The endpoints of zone 436 are the output terminals of logic gates 412, 422, and 416.

If the required times at the endpoints of the zone are out-of-date, the system can propagate required times backwards until the required times at the endpoints are up-to-date. For example, if the required times at the endpoints of zone 436 are out-of-date, the system can update them as follows. Let us assume that the required times at the output terminals of logic gates 426 and 428 are up-to-date. Then, the system can propagate the required time from the output terminal of logic gate 426 to the input terminals of logic gate 426. Next, the system can propagate the updated required time from the output terminal of logic gate 424 to the input terminal of logic gate 424.

After applying a transformation to logic gate 408, the system can propagate timing information within zone 436. Since the arrival times and transition times are only propagated within the zone (as opposed to being propagated through the entire network), it substantially reduces the amount of computation required for propagating timing information.

Once the arrival times and required times at the endpoints of the zone are up-to-date, the system can compute one or more timing metrics using the up-to-date arrival times and required times. If the transformation does not degrade the timing metrics, the system can accept the transformation.

Note that applying a leakage-power-reducing transformation to a logic gate causes the required times to be out-of-date. Conventional approaches typically update the required times across the entire circuit before trying to optimize leakage power of the next logic gate. In contrast to conventional approaches, embodiments of the present invention mark the required times of affected logic gates as out-of-date. Specifically, some embodiments of the present invention mark the required times as out-of-date along a cone of logic that extends backwards from the endpoints of the zone. Note that marking required times as out-of-date requires substantially less computation than propagating required times. For example, in FIG. 4, after accepting a transformation for logic gate 408, the system can mark the required times for all logic gates in zone 436 as out-of-date. Further, the required times of logic gates 402, 404, 406, and any other logic gates that are within the fan-in cone of these logic gates can also be marked as out-of date. Note that the marking of out-of-date required times only travels all the way to the timing startpoints when processing cells on the first level of logic near the timing endpoints. Since the logic gates are processed in reverse levelized order, the marking process on subsequent levels of logic stops as soon as a gate that is already marked out-of-date is reached. Typically, this would be just one level of logic backward from the logic gate being processed.

Figure 5:
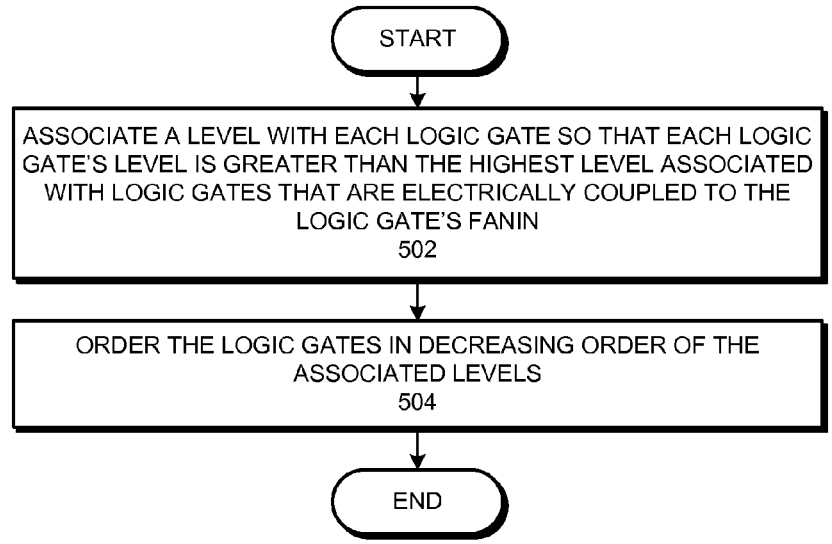
FIG. 5 presents a flowchart illustrating a process for determining a processing order for processing logic gates of a circuit design in accordance with some embodiments of the present invention.

FIG. 5 presents a flowchart illustrating a process for determining a processing order for processing logic gates of a circuit design in accordance with some embodiments of the present invention.

As mentioned above, the system optimizes logic gates in a reverse levelized order. Specifically, the system can begin by associating a level with each logic gate so that each logic gate's level is greater than the highest level associated with logic gates that are electrically coupled to the logic gate's fan-in (operation 502). Next, the system can order the logic gates in decreasing order of the associated levels (operation 504).

Figure 6:
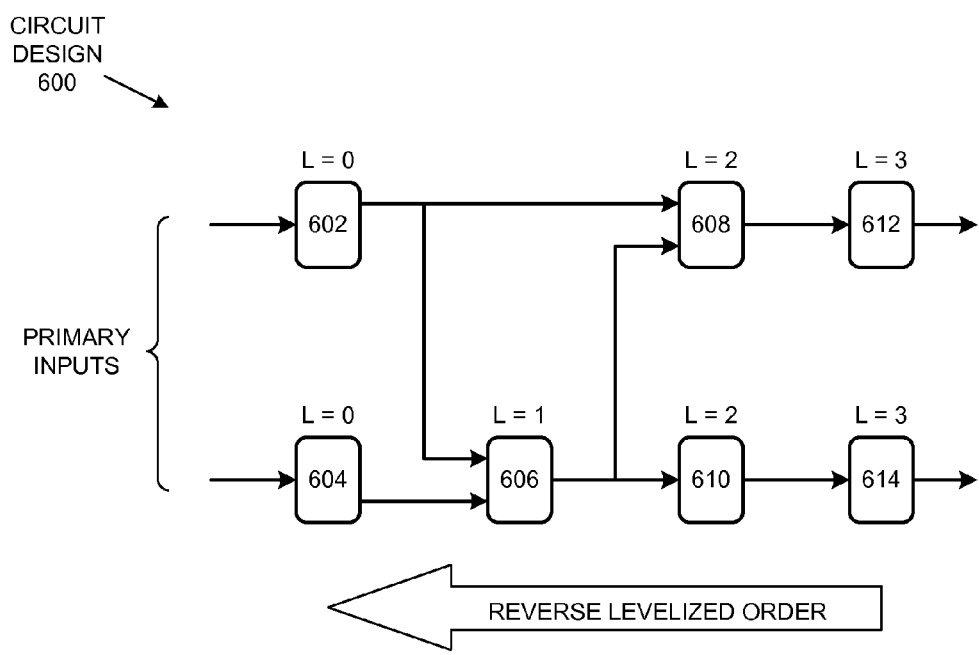
FIG. 6 illustrates topology levels associated with logic gates of a circuit design in accordance with some embodiments of the present invention.

FIG. 6 illustrates topology levels associated with logic gates of a circuit design in accordance with some embodiments of the present invention. In the figure, the notation "L=n," where n is a number indicates that the level associated with the logic gate is equal to n.

Specifically, circuit design 600 includes logic gates 602-614, which span levels zero through three. Logic gates 602-604, whose fan-in is coupled to a primary input of the circuit design, can be assigned level 0. All other logic gates can be assigned a level that is greater than the highest level associated with the logic gates that are electrically coupled to the logic gate's fan-in. For example, logic gate 606 can be assigned level 1, logic gates 608-610 can be assigned level 2, and logic gates 612-614 can be assigned level 3. In a reverse levelized processing order, the system processes logic gates in decreasing order of the associated levels. For example, the system would optimize logic gates 612 and 614 before optimizing logic gates 608 and 610, and so forth.

For optimizing logic gates, the system can use a technology library that includes a variety of physical implementations for logic gates, and includes a leakage power value for each physical implementation. The MOS transistors used to implement these physical implementations can vary by transistor dimensions, threshold voltage, gate capacitance, etc. Note that the leakage power of a logic gate typically increases exponentially with respect to the threshold voltage of the transistors in the logic gate.

The leakage potential of a logic gate in a circuit design is the maximum leakage improvement that can be achieved by replacing the logic gate with a functionally equivalent logic gate which has the lowest leakage power. For example, assume that a technology library has 100 physical implementations for a buffer, and the leakage power of these buffers is within the range [10, 1000] μW. Also, assume that a buffer in a circuit design has a leakage power of 500 μW. The leakage potential of this buffer is (500-10) μW=490 μW. Therefore, the maximum leakage improvement that can be achieved by replacing this buffer is 490 μW.

The system can use a leakage power budget for a circuit design to minimize the computation effort invested in optimizing a circuit design's leakage power. The leakage power budget is a circuit designer's budget for how much leakage power that a chip is allowed to dissipate. The leakage power budget enables the system to de-prioritize logic gates that have a very low leakage potential. For example, assume that the leakage power of a circuit design is 500 μW, and assume the leakage power budget is 300 μW. Now, once the system optimizes the circuit design's leakage power to 300 μW by working on higher leakage potential logic gates, the system can sacrifice an additional reduction in leakage power by terminating the optimization process.

Figure 7:
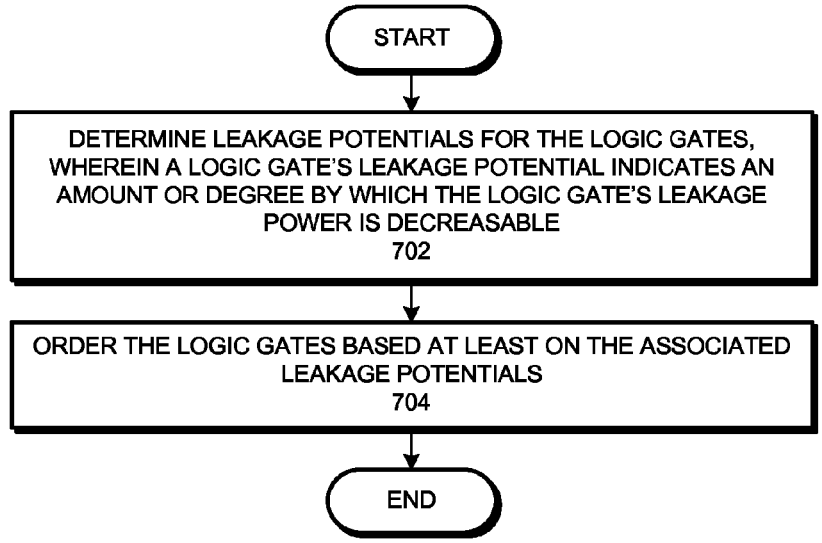
FIG. 7 presents a flowchart illustrating a process for determining a processing order for processing logic gates of a circuit design in accordance with some embodiments of the present invention.

FIG. 7 presents a flowchart illustrating a process for determining a processing order for processing logic gates of a circuit design in accordance with some embodiments of the present invention.

The system can begin by determining leakage potentials for the logic gates, wherein a logic gate's leakage potential indicates an amount or degree by which the logic gate's leakage power is decreasable (operation 702). Then, the system orders the logic gates based at least on the associated leakage potentials (operation 704).

During operation 704, the system can associate a circuit design's logic gates with leakage-potential bins, such that each leakage-potential bin is associated with a range of leakage potential values. Further, the system can order the logic gates based on their associated leakage-potential bins. In doing so, the system classifies or "bins" the logic gates into multiple groups based on their leakage potential values. For example, the first bin can be associated with logic gates that have a highest leakage potential, and the last bin can be associated with logic gates that have a lowest leakage potential.

Logic gates associated with a particular bin do not need to have the same leakage potential, but rather are associated with a range of leakage potential values that have been assigned to that bin. Binning the logic gates of a circuit design into a predetermined set of bins facilitates evaluating the leakage potential for groups of logic gates. For example, the sum of leakage potential values for particular bin's set of logic gates can be used to determine a bin's potential.

The bin potential ratio can be defined as the sum of the leakage potentials of logic gates in a particular bin divided by the circuit's leakage power.

The bin potential ratio (BPR) for a bin can be represented as:

$$BPR_i = \frac{\sum_{l \in b_i} p_l}{L}, \quad (1)$$

where $BPR_i$ is the bin potential ratio for bin $b_i$, l is a logic gate, $p_l$ is the leakage potential of logic gate l, and L is the leakage power of the circuit design.

Note that the $BPR_i$ indicates the maximum improvement in leakage power that can be achieved if the system were to transform all logic gates associated with the bin $b_i$ to their lowest leakage power implementation in the technology library. The $BPR_i$ of bin $b_i$ can be used to determine whether to process logic gates in bin $b_i$. For example, if the $BPR_i$ of bin $b_i$ is lower than a predetermined threshold, the system may skip processing the logic gates in bin $b_i$.

In some embodiments, the system can order the logic gates associated in a leakage-potential bin in decreasing order of the associated levels. This allows the system to process the logic gates associated with each bin in reverse levelized order.

Figure 8:
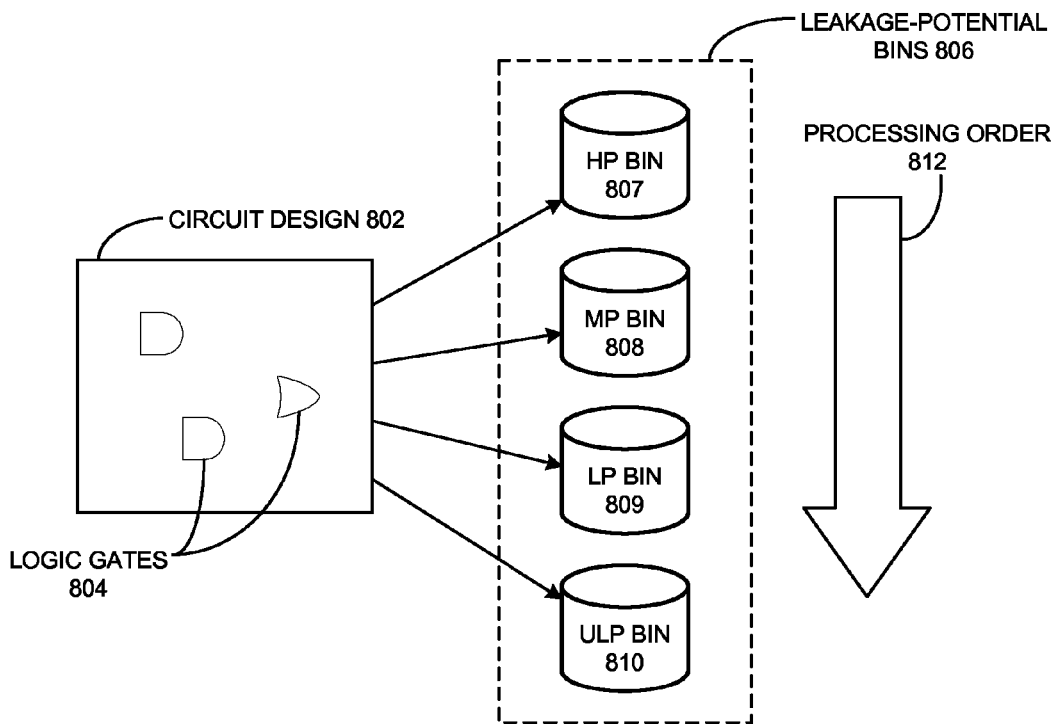
FIG. 8 illustrates a set of leakage-potential bins and an exemplary processing order in accordance with some embodiments of the present invention.

FIG. 8 illustrates a set of leakage-potential bins and an exemplary processing order in accordance with some embodiments of the present invention. Circuit design 802 includes a set of logic gate instances 804, and leakage potential bins 806 can include a predetermined set of bins. For example, leakage-potential bins 806 can include four bin categories: a high potential (HP) bin 807, a medium potential (MP) bin 808, a low potential (LP) bin 809, and an ultra-low potential (ULP) bin 810. Further, a bin is associated with higher bin category (e.g., bin 807) can be associated with a higher range of leakage potential values than other bins with a lower bin category (e.g., bins 808-810).

During operation, the system can associate each logic gate instance of circuit design 802 with a corresponding leakage-potential bin, and then process logic gate instances 804 based in part on processing order 812. For example, the system can process logic gates associated with bin 807 before processing logic gates associated with any other bin. Then, the system can process logic gates associated with the other bins using processing order 812 until either a performance goal for circuit design 802 has been met, or until the quality of returns (QoR) per processing operation falls below a threshold value.

The logic gates in each bin can be processed in reverse levelized order. That is, first the logic gates in HP bin 807 are optimized by visiting them in reverse levelized order, then the logic gates in MP bin 808 are optimized by visiting them in reverse levelized order, etc.

In some embodiments, the system can associate logic gates with leakage-potential bins by first sorting the circuit design's logic gates based in part on their leakage-potential values, and then partitioning the sorted set of logic gates evenly across leakage-potential bins 806 (i.e., so that all bins are associated with a similar number of logic gates). In some other embodiments, the system can associate logic gates with leakage-potential bins by first dividing the full range of leakage-potential values across leakage-potential bins 806, and then associating each logic gate with a corresponding leakage-potential bin.

In some embodiments, the system optimizes the leakage power of a circuit design by performing at least two iterations through the circuit design, such that each iteration performs a sequence of leakage-power-reducing operations on logic gates of the circuit design in reverse levelized order. Specifically, the system performs a first sequence of leakage-power-reducing operations using the leakage-potential bin with the highest associated leakage potential (e.g., HP bin 807). Then, the system performs a second sequence of leakage-power-reducing operations using the remaining leakage-potential bins (e.g., bins 808-810).

Figure 9:
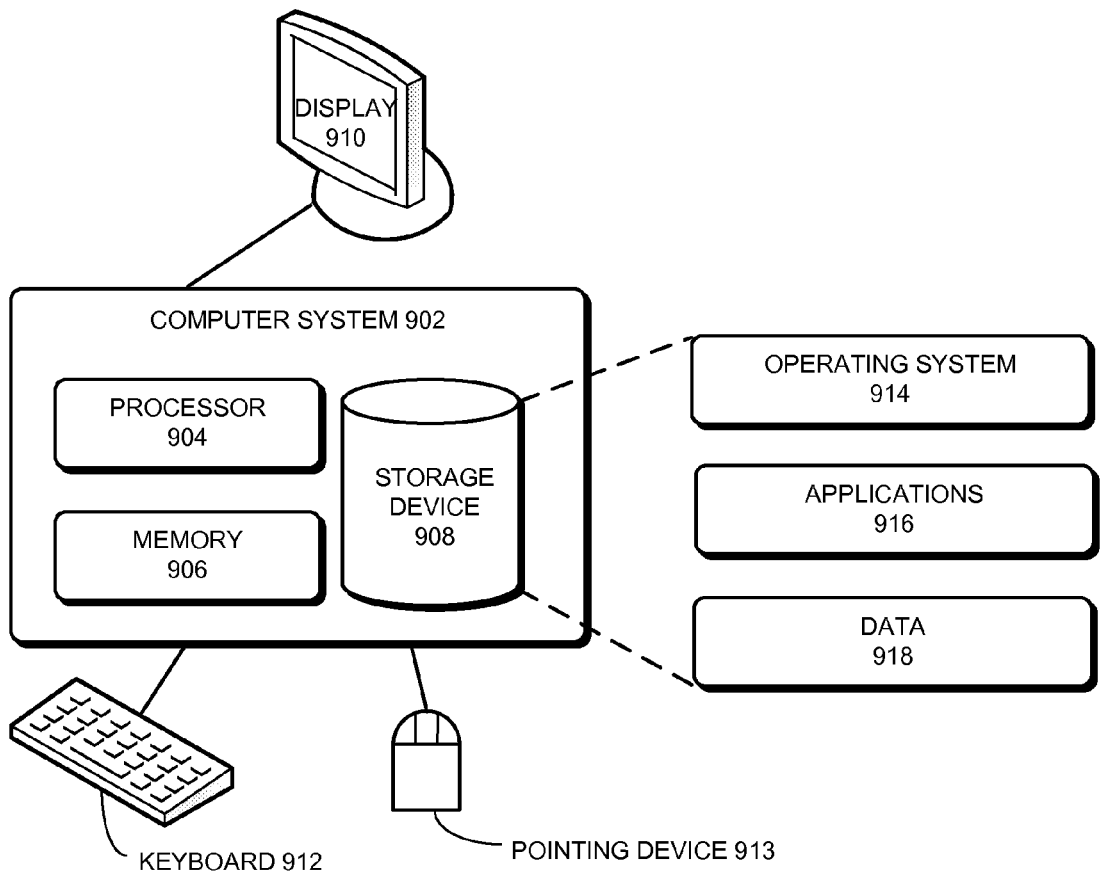
FIG. 9 illustrates a computer system in accordance with some embodiments of the present invention.

FIG. 9 illustrates a computer system in accordance with some embodiments of the present invention.

Computer system 902 includes a processor 904, a memory 906, and a storage device 908. Furthermore, computer system 902 can be coupled to a display device 910, a keyboard 912, and a pointing device 913. Storage device 908 can store operating system 914, applications 916, and data 918.

Applications 916 can include instructions, which when executed by computer system 902, can cause computer system 902 to perform methods and/or processes described in this disclosure. Specifically, applications 916 can include instructions for receiving a set of logic gates in a circuit design, determining leakage potentials for the set of logic gates, determining a processing order for processing the logic gates, selecting a leakage-power-reducing transformation for a logic gate, determining a zone around the logic gate, propagating arrival times within the zone to obtain updated slack values at endpoints of the zone, and applying the leakage-power-reducing transformation to the logic gate in response to determining that the updated slack values at the endpoints of the zone do not degrade one or more circuit timing metrics. Further, applications 916 can include instructions for marking required times out-of-date after a transformation is accepted, and performing lazy updates of the required times after a logic gate is picked, a zone is created, and before any transformation is applied.

Data 918 can include any data that is required as input or that is generated as output by the methods and/or processes described in this disclosure. Specifically, data 918 can include representations for a circuit design, timing information (e.g., arrival time, required time, slack values) and leakage potential values for logic gates in the circuit design, leakage-potential bins, a technology library, and design requirements for the circuit design.

Figure 10:
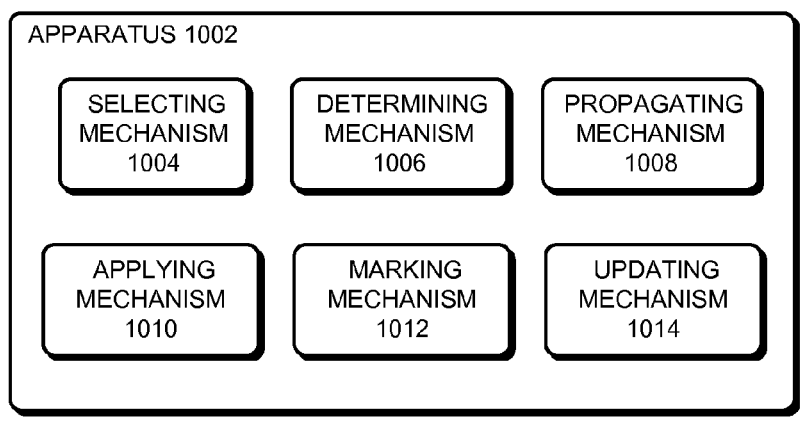
FIG. 10 illustrates an apparatus in accordance with some embodiments of the present invention.

FIG. 10 illustrates an apparatus in accordance with some embodiments of the present invention.

Apparatus 1002 can comprise a plurality of mechanisms which may communicate with one another via a wired or wireless communication channel. Apparatus 1002 may be realized using one or more integrated circuits, and apparatus 1002 may include fewer or more mechanisms than those shown in FIG. 10. Further, apparatus 1002 may be integrated in a computer system, or it may be realized as a separate device which is capable of communicating with other computer systems and/or devices. Specifically, apparatus 1002 can comprise selecting mechanism 1004, determining mechanism 1006, propagating mechanism 1008, marking mechanism 1010, and updating mechanism 1012.

Selecting mechanism 1004 can be configured to select a leakage-power-reducing transformation for a logic gate. Determining mechanism 1006 can be configured to determine a zone around the logic gate, wherein the zone includes logic gates within a first predetermined number of levels in the logic gate's fan-out(s), the logic gate's fan-in(s), and a second predetermined number of levels in the fan-out(s) of the logic gate's fan-in(s). Determining mechanism 1006 can also be configured to determine a reverse-levelized processing order, and to determine a sorted bin processing order. Propagating mechanism 1008 can be configured to propagate arrival times within the zone to obtain updated slack values at endpoints of the zone. Applying mechanism 1010 can be configured to apply the leakage-power-reducing transformation to the logic gate if the updated slack values at the endpoints of the zone do not degrade one or more circuit timing metrics. Marking mechanism 1012 can be configured to determine a cone of logic that extends backwards from the endpoints of the zone, and mark required times of logic gates in the cone of logic as out-of-date. Updating mechanism 1014 can be configured to update required times until at least the required times associated with the endpoints are up-to-date.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for optimizing leakage power of a circuit design which includes logic gates, the method comprising:
    selecting a leakage-power-reducing transformation for a logic gate;
    determining, by computer, a zone around the logic gate, wherein the zone includes logic gates within a first predetermined number of levels in the logic gate's fan-out, the logic gate's fan-in, and a second predetermined number of levels in the logic gate's fan-in's fan-out;
    propagating arrival times within the zone to obtain updated slack values at endpoints of the zone; and
    in response to determining that the updated slack values at the endpoints of the zone do not degrade one or more circuit timing metrics, applying the leakage-power-reducing transformation to the logic gate.

2. The computer-implemented method of claim 1, wherein the method further comprises:
    determining a cone of logic that extends backwards from the endpoints of the zone; and
    marking required times of logic gates in the cone of logic as out-of-date.

3. The computer-implemented method of claim 1, wherein the method further comprises updating required times until at least the required times associated with the endpoints of the zone are up-to-date.

4. The computer-implemented method of claim 1, wherein the method further comprises:
    determining a processing order for processing the logic gates; and
    selecting the logic gate according to the processing order.

5. The computer-implemented method of claim 4, wherein determining the processing order for processing the logic gates includes:
    associating a level with each logic gate so that each logic gate's level is greater than the highest level associated with logic gates that are electrically coupled to the logic gate's fan-in; and
    ordering the logic gates in decreasing order of the associated levels.

6. The computer-implemented method of claim 4, wherein determining the processing order for processing the logic gates includes:
    determining leakage potentials for the logic gates, wherein a logic gate's leakage potential indicates an amount or degree by which the logic gate's leakage power is decreasable; and
    ordering the logic gates based at least on the associated leakage potentials.

7. The computer-implemented method of claim 6, wherein ordering the logic gates based at least on the associated leakage potentials includes:
    associating the logic gates with leakage-potential bins, wherein each leakage-potential bin is associated with a range of leakage potential values; and
    ordering the logic gates based on the associated leakage-potential bins so that logic gates in a high leakage-potential bin are processed in a reverse-levelized order before logic gates in a low leakage-potential bin are processed in a reverse-levelized order.

8. The computer-implemented method of claim 1, wherein the one or more circuit timing metrics include a worst negative slack metric.

9. The computer-implemented method of claim 1, wherein the one or more circuit timing metrics include a total negative slack metric.

10. A non-transitory computer-readable storage medium storing instructions that when executed by a computer cause the computer to perform a method for optimizing leakage power of a circuit design which includes logic gates, the method comprising:
    selecting a leakage-power-reducing transformation for a logic gate;
    determining a zone around the logic gate, wherein the zone includes logic gates within a first predetermined number of levels in the logic gate's fan-out, the logic gate's fan-in, and a second predetermined number of levels in the logic gate's fan-in's fan-out;
    propagating arrival times within the zone to obtain updated slack values at endpoints of the zone; and
    in response to determining that the updated slack values at the endpoints of the zone do not degrade one or more circuit timing metrics, applying the leakage-power-reducing transformation to the logic gate.

11. The non-transitory computer-readable storage medium of claim 10, wherein the method further comprises:
    determining a cone of logic that extends backwards from the endpoints of the zone; and
    marking required times of logic gates in the cone of logic as out-of-date.

12. The non-transitory computer-readable storage medium of claim 10, wherein the method further comprises updating required times until at least the required times associated with the endpoints of the zone are up-to-date.

13. The non-transitory computer-readable storage medium of claim 10, wherein the method further comprises:
    determining a processing order for processing the logic gates; and
    selecting the logic gate according to the processing order.

14. The non-transitory computer-readable storage medium of claim 13, wherein determining the processing order for processing the logic gates includes:
    associating a level with each logic gate so that each logic gate's level is greater than the highest level associated with logic gates that are electrically coupled to the logic gate's fan-in; and
    ordering the logic gates in decreasing order of the associated levels so that logic gates in a high leakage-potential bin are processed in a reverse-levelized order before logic gates in a low leakage-potential bin are processed in a reverse-levelized order.

15. The non-transitory computer-readable storage medium of claim 13, wherein determining the processing order for processing the logic gates includes:

determining leakage potentials for the logic gates, wherein a logic gate's leakage potential indicates an amount or degree by which the logic gate's leakage power is decreasable; and ordering the logic gates based at least on the associated leakage potentials.

16. The non-transitory computer-readable storage medium of claim 15, wherein ordering the logic gates based at least on the associated leakage potentials includes:

associating the logic gates with leakage-potential bins, wherein each leakage-potential bin is associated with a range of leakage potential values; and ordering the logic gates based on the associated leakage-potential bins.

17. The non-transitory computer-readable storage medium of claim 10, wherein the one or more circuit timing metrics include a worst negative slack metric.

18. The non-transitory computer-readable storage medium of claim 10, wherein the one or more circuit timing metrics include a total negative slack metric.

19. An apparatus for optimizing leakage power of a circuit design which includes logic gates, comprising:

a selecting mechanism configured to select a leakage-power-reducing transformation for a logic gate;

a determining mechanism configured to determine a zone around the logic gate, wherein the zone includes logic gates within a first predetermined number of levels in the logic gate's fan-out, the logic gate's fan-in, and a second predetermined number of levels in the logic gate's fan-in's fan-out;

a propagating mechanism configured to propagate arrival times within the zone to obtain updated slack values at endpoints of the zone; and an applying mechanism configured to apply the leakage-power-reducing transformation to the logic gate in response to determining that the updated slack values at the endpoints of the zone do not degrade one or more circuit timing metrics.

20. The apparatus of claim 19, further comprising a marking mechanism configured to:

determine a cone of logic that extends backwards from the endpoints of the zone; and mark required times of logic gates in the cone of logic as out-of-date.

21. The apparatus of claim 19, further comprising an updating mechanism configured to update required times until at least the required times associated with the endpoints are up-to-date.

* * * * *